(12) United States Patent
Rickner et al.

(10) Patent No.: US 6,841,111 B2
(45) Date of Patent: *Jan. 11, 2005

(54) METHOD FOR MAKING A POLYUREA-POLYURETHANE COMPOSITE STRUCTURE SUBSTANTIALLY FREE OF VOLATILE ORGANIC COMPOUNDS

(75) Inventors: Stephen Rickner, Irvine, CA (US); Joseph Jibrail, Mission Viejo, CA (US); Jose Camba, West Covina, CA (US); Carlos Velasco, Jr., Corona, CA (US); Calvin Peeler, Canton, MI (US); Michael May, Clawson, MI (US)

(73) Assignee: BASF Corporation, Mt. Olive, NJ (US)

( * ) Notice: Subject to any disclaimer, the term of this patent is extended or adjusted under 35 U.S.C. 154(b) by 361 days.

This patent is subject to a terminal disclaimer.

(21) Appl. No.: 09/944,561

(22) Filed: Aug. 31, 2001

(65) Prior Publication Data

US 2003/0047836 A1 Mar. 13, 2003

(51) Int. Cl.⁷ .............................................. B29C 45/16
(52) U.S. Cl. ...................... 264/250; 264/251; 264/255; 428/423.3
(58) Field of Search ................................ 264/250, 251, 264/255, 264, 308; 428/423.3

(56) References Cited

U.S. PATENT DOCUMENTS

| | | | |
|---|---|---|---|
| 4,000,028 A | * 12/1976 | Hoey ........................... 156/79 |
| 4,389,454 A | 6/1983 | Horacek et al. |
| 4,797,320 A | * 1/1989 | Kopp et al. ............... 428/316.6 |
| 5,116,557 A | 5/1992 | Debaes et al. |
| 5,118,728 A | 6/1992 | Primeaux |
| 5,154,871 A | * 10/1992 | Wagner et al. ............... 264/255 |
| 5,171,818 A | 12/1992 | Wilson |
| 5,215,796 A | 6/1993 | Mueller et al. |
| 5,543,225 A | 8/1996 | Mueller et al. |
| 5,595,701 A | * 1/1997 | MacGregor et al. ......... 264/255 |
| 5,985,986 A | 11/1999 | Kubitza et al. |
| 6,026,760 A | 2/2000 | Phillips et al. |
| 6,092,343 A | 7/2000 | West et al. |
| 6,165,308 A | * 12/2000 | Chen et al. .................. 156/289 |
| 6,617,032 B2 | * 9/2003 | Rickner et al. .......... 428/423.3 |
| 2002/0086115 A1 | * 7/2002 | Lamers et al. ........... 427/385.5 |

* cited by examiner

Primary Examiner—Michael Colaianni
Assistant Examiner—Monica A. Fontaine
(74) Attorney, Agent, or Firm—Fernando A. Borrego; Howard & Howard

(57) ABSTRACT

A method of making a polyurea—polyurethane composite structure that is substantially free from emission of volatile organic compounds is disclosed. The composite structure produced according to the method of the subject invention has a flexural modulus of at least 200,000 lb/in². The composite structure includes first and second layers. A mold substrate is provided and a first-layer polyisocyanate component and a first-layer resin component are reacted and sprayed onto the mold substrate to form the first-layer. The first-layer polyisocyanate component includes an aliphatic polyisocyanate, and the first-layer resin component includes a polyamine thereby forming a polyurea show surface having a Shore D hardness of at least 65. After application of the first-layer, a second-layer polyisocyanate component and a second-layer resin component are reacted and sprayed behind the first-layer to form the second-layer of the composite structure. The second layer resin component more specifically includes a polyol having a theoretical functionality of at least three. The first and second layers of the composite are substantially free of VOCs.

37 Claims, No Drawings

METHOD FOR MAKING A POLYUREA-POLYURETHANE COMPOSITE STRUCTURE SUBSTANTIALLY FREE OF VOLATILE ORGANIC COMPOUNDS

FIELD OF THE INVENTION

The present invention relates generally to a method for making a polyurea—polyurethane composite structure that is substantially free from emissions of volatile organic compounds (VOCs). The present invention more specifically relates to a method of making a composite structure having a flexural modulus of at least 200,000 lb/in$^2$ that is utilized in the boating, automobile, swimming pool, and bathtub industries and that includes a first, or top, layer which is a show surface of the composite structure and is derived from polyisocyanate and a polyamine, and a second, or polyurethane-backing layer derived from polyisocyanate and a polyol having a theoretical functionality of at least three. The first and second-layers of the composite structure are both substantially free of VOCs.

BACKGROUND OF THE INVENTION

Methods for making composite structures that are used throughout the boating, automobile, swimming pool, and bathtub industries are known in the art. These conventional methods for making composite structures typically produce composite structures that include a first, or top, layer of styrenated polyester. In the convention methods, the first-layer of styrenated polyester is applied to a mold substrate, and during the application of the first-layer, large quantities of styrene monomers, which are considered volatile organic compounds (VOCs), are emitted into the surrounding environment. Emission of styrene monomers is highly undesirable for environmental, health, and safety reasons. Furthermore, large quantities of other VOCs, such as methyl ethyl ketone, are also typically emitted in these conventional methods. Emission of these other VOCs occurs during the application and the cross-linking of the various layers of the composite structure, including the styrenated polyester first-layer. As with emission of the styrene monomers, emission of these other VOCs is also undesirable for environmental, health, and safety reason.

Furthermore, it is known in the art that styrenated polyesters are excessively brittle, and because the first, or top, layer of these composite structures include styrenated polyesters, the method for making the composite structures of the prior art produce composite structures that typically suffer from cracking and chipping defects due to this excessive brittleness. Such defects become particularly apparent during shipping and handling, during transportation, and even during use of the composite structures. Finally, the methods of making the composite structures of the prior art also utilize various aromatic components, such as aromatic isocyanates and styrene, which are components that are unstable over exposure to ultraviolet light. As such, these methods are deficient because they produce composite structures that are unstable over exposure to ultraviolet light.

Due to the inefficiencies identified in the methods for making the composite structures of the prior art, it is desirable to provide a novel method for making a durable composite structure that includes a top layer that does not emit VOCs during application to the mold substrate and that utilizes aliphatic components such that the top layer, and therefore the entire composite structure, is stable under exposure to ultraviolet light.

SUMMARY OF THE INVENTION

According to the present invention, a method for making a composite structure having a flexural modulus of at least 200,000 lb/in$^2$ is provided. The method of the subject invention provides a mold substrate, and the composite structure made according to the method of the subject invention includes a first-layer and a second-layer that are applied to the mold substrate. The first-layer has a Shore D hardness of at least 65 which is a hardness that balances durability properties of the composite structure and protection against chipping and cracking defects like those observed in the prior art. Also, the first-layer preferably includes aliphatic components which are ultraviolet light stable.

As understood by those skilled in the art, the first-layer is a top layer, or show surface, of the completed composite structure, and the second-layer is a backing layer that functions to provide support and durability to the completed composite structure. The first-layer of the composite structure is substantially free of volatile organic compounds (VOCs). As such, in the method of the subject invention, the first-layer does not emit VOCs into the surrounding environment during application of the first-layer to the mold substrate.

The method includes the step of applying a first-layer polyisocyanate component and a first-layer resin component to the mold substrate to form the first-layer of the composite structure. More specifically, the first-layer polyisocyanate component includes an aliphatic polyisocyanate, and the first-layer resin component includes a polyamine, preferably an aliphatic polyamine, that reacts with the first-layer polyisocyanate component to form the first-layer. As such, the first-layer is a polyurea, preferably an aliphatic polyurea, that is stable under exposure to ultraviolet light.

After the first-layer is formed, a second-layer polyisocyanate component and a second-layer resin component are applied to form the second-layer of the composite structure. As with the first-layer, the second-layer of the present invention is also substantially free of VOCs. The second-layer resin component includes a polyol having a theoretical functionality of at least three. As such, the physical properties of the polyol in the second-layer resin component contribute to a second-layer that provides substantial support and durability to the completed composite structure. Although optional, it is preferred that the method also includes the step of applying a barrier layer polyisocyanate component and a barrier layer resin component to the first-layer prior to forming the second-layer to form a barrier layer between the first and second-layers that optimizes gel times, cross-linking rates, and minimizes 'peel' realized in the first-layer which, as described above, is the show surface of the composite structure.

DETAILED DESCRIPTION OF A PREFERRED EMBODIMENT

A method for making a composite structure is disclosed. The method of the subject invention produces a composite structure with at least one first-layer and at least one second-layer. Preferably, there is only one first-layer. The method of the subject invention also produces a composite structure having a flexural modulus of at least 200,000 lb/in$^2$. The method provides a mold substrate, and the first and second-layers are applied to the mold substrate to form the composite structure. Application of the first and second-layers will be described in greater detail below. As appreciated by those skilled in the art, the mold substrate is in whatever shape is desired for production of the composite structure. Preferably, the mold substrate is an open-mold substrate where the first-layer is first applied to a surface of the open-mold substrate, and then the second-layer is applied after the first-layer without the mold substrate having to close on itself to form the completed composite structure. After application of the first and second-layers, and after a de-molding of the completed composite structure, the first-layer is a top layer or show surface of the composite structure whereas the second-layer is a backing layer to the first-layer. Both the first and second-layers of the subject invention are substantially free of volatile organic compounds (VOCs).

According to the subject invention, it is to be generally understood that substantially free of VOCs is intended to indicate that, during the production of the first and second layers, no significant amount, and preferably no amount, of volatile chemical compounds are emitted by the components producing such layers or the reaction mixtures thereof, where volatile chemical compounds are defined by those that contains the element carbon, excluding certain exempted compounds such as methane, carbon monoxide, carbon dioxide, carbonic acid, metallic carbides and carbonates, ammonium carbonate, and other exempt compounds. This is particularly relevant when the subject invention is compared to VOCs emitted by processes which utilize styrenated polyester compounds as reactants for the layers. This definitional standard is found under South Coast Air Quality Management District's (SCAQMD) Regulation I, Rule 102, entitled "Definition Of Terms" adopted Feb. 4, 1977 and last amended Apr. 9, 1999, and under SCAQMD's Regulation XI, Rule 1162, entitled "Polyester Resin Operations" adopted Mar. 6, 1987 and last amended Nov. 17, 2000. Under the Rule 1162 definitional standard, other exempt compounds include, but are not limited to, Group I Exempt Compounds, specifically chlorodifluoromethane (HCFC-22), dichlorotrifluoroethane (HCFC-123), tetrafluoroethane (HFC-134a), dichlorofluoroethane (HCFC-141b), chlorodifluoroethane (HCFC-142b), trifluoromethane (HFC-23), 2-chloro-1,1,1,2-tetrafluoroethane (HCFC-124), pentafluoroethane (HFC-125), 1,1,2,2-tetrafluoroethane (HFC-134), 1,1,1-trifluoroethane (HFC-143a), 1,1-difluoroethane (HFC-152a), cyclic branched, or linear, completely fluorinated alkanes, cyclic, branched, or linear, completely fluorinated ethers with no unsaturations, cyclic, branched, or linear, completely fluorinated tertiary amines with no unsaturations, and sulfur-containing perfluorocarbons with no unsaturations and with sulfur bonds only to carbon and fluorine, and Group II Exempt Compounds, specifically methylene chloride, carbon tetrachloride, 1,1,1-trichloroethane (methyl chloroform), trichlorotrifluoroethane (CFC-113), dichlorodifluoromethane (CFC-12), trichlorofluoromethane (CFC-11), dichlorotetrafluoroethane (CFC-114), chloropentafluoroethane (CFC-15).

SCAQMD's definition for VOCs is but one definitional standard that is currently observed by some counties in California. It is to be understood that the remaining counties in California, other states, and other jurisdictions may observe other definitional standards for defining a VOC and acceptable levels of VOCs. For instance, another definitional standard defining a VOC, which is arguably most likely to be observed, is found in 40 CFR Part 59, Section 59.401, entitled "Definitions" and specifically sets forth that a VOC is any organic compound that participates in atmospheric photochemical reactions and is not exempted for having negligible photochemical reactivity. Compounds considered to have negligible photochemical reactivity, which are also referred to as exempt compounds, can be found in 40 CFR Part 59, Section 51.100(s). Generally, one skilled in the art will appreciate and know the meaning of substantially free of VOCs.

The method includes the step of applying a first-layer polyisocyanate component including an aliphatic polyisocyanate and a first-layer resin component including a polyamine to the mold substrate to form the first-layer. As stated above, the first-layer is the show surface of the composite structure and is also substantially free of volatile organic compounds. Furthermore, the first-layer has a Shore D hardness of at least 65 which will be discussed in greater detail below. Depending on the embodiment, the first-layer polyisocyanate component of the subject invention preferably includes an aliphatic polyisocyanate. In other words, the first-layer polyisocyanate component may also include aromatic polyisocyanates. For instance, in composite structures where UV stability is not critical, or in composite structures where UV stability is critical but dark pigment additives, such as carbon black pigment, are utilized, then aliphatic polyisocyanates are not required to achieve adequate UV stability. On the other hand, in composite structures where UV stability is critical, especially when light pigment additives, such as $TiO_2$ pigment, are utilized, then aliphatic polyisocyanates are necessary for UV stability and are therefore preferred. Suitable polyisocyanates for the first-layer polyisocyanate component, both aromatic and aliphatic, are described below in significant detail in terms of the second-layer. Whenever the term aliphatic is used throughout the subject application, it is intended to indicate both aliphatic and alicyclic. That is, aliphatic indicates both straight-chain arrangements of carbon atoms (non-cyclic) as well as arrangements of carbon atoms in closed ring structures (cyclic) so long as these arrangements are not aromatic.

Suitable aliphatic polyisocyanates of the first-layer polyisocyanate component include isocyanates selected from the group consisting of hexamethylene diisocyanate (HDI), isophorone diisocyanate (IPDI), and mixtures thereof. In a preferred embodiment of the subject invention, the aliphatic polyisocyanate of the first-layer polyisocyanate component is a blend of HDI and IPDI at a weight ratio of approximately 1:5, respectively. Other aliphatic polyisocyanates that may be utilized in the first-layer polyisocyanate component include, but are not limited to, dicyclohexane-4,4' diisocyanate (Desmodur W), hexamethylene diisocyanate trimer (HDI Trimer), isophorone diisocyanate trimer (IPDI Trimer), hexamethylene diisocyanate biuret (HDI Biuret), cyclohexane diisocyanate, meta-tetramethylxylene diisocyanate (TMXDI), and mixtures thereof. Additionally, it is to be understood that the first-layer polyisocyanate component may be a pre-polymer. That is, the first-layer polyisocyanate component may be a polymeric IPDI initiated pre-polymer including IPDI and a stoichiometrically insufficient amount of the first-layer resin component or other polyamine and polyol resin components. The first-layer polyisocyanate component may also include an aromatic polyisocyanate. In such cases, it may be necessary to supplement the first-layer with at least one UV performance-enhancing additive such that the first-layer which is the show surface of the composite structure is stable under exposure to ultraviolet light. Suitable UV performance enhancing additives are described below.

As identified above, the first-layer also incorporates the first-layer resin component. The first-layer resin component includes a compound that reacts, or cross-links, with the first-layer polyisocyanate component to form the first-layer. This compound comprises a polyamine. As such, the first-layer comprises a polyurea. The polyamine can be an aromatic or aliphatic polyamine, or mixtures thereof. The polyamine can also be a polyether or polyester polyamine. Preferably, the polyamine is an aliphatic polyamine, most preferably an aliphatic polyether polyamine. It is to be understood that the first-layer resin component can optionally include some amounts of polyols. Suitable polyols for the first-layer resin component are described below in significant detail in terms of the second-layer.

If the aliphatic polyamine is selected as the compound to react with the first-layer polyisocyanate component, such as IPDI, then the first-layer is the aliphatic polyurea. The aliphatic polyamine is selected from the group consisting of polyoxyalkylene amines, polyoxyalkylene diamines, and polyoxyalkylene triamines. Preferably, the aliphatic polyamine is polyoxypropylene diamine. In this preferred embodiment, the polyoxypropylene diamine reacts with the IPDI to form the aliphatic polyurea as the first-layer.

In addition to the first-layer polyisocyanate component and a first-layer resin component, the first-layer may also include one or more additives directed at enhancing the performance of one or more physical properties of the first-layer. For instance, the additive or additives may be selected from the group consisting of surfactants, flame retardants, fillers, dyes, water scavengers, anti-foam agents, catalysts, UV performance enhancers, pigments, hindered amine light stabilizers, and mixtures thereof. Other suitable additives include, but are not limited to, cell regulators, hydrolysis-protection agents, fungistatic and bacteriostatic substances, dispersing agents, adhesion promoters, and appearance enhancing agents. Although the subject invention is not intended to be limited to these examples, some specific examples of these additives include, in no particular order, aluminum tri-hydrate, calcium carbonate, gypsum, wollastonite, phosphorus, silica, glass including glass beads, calcium sulfate, and magnesium hydroxide.

The catalysts which may be employed as an additive greatly accelerate the reaction between the first-layer polyisocyanate component and the first-layer resin component. Examples of suitable catalysts are organometallic catalysts, preferably organotin catalysts, although it is possible to employ metals such as lead, titanium, copper, mercury, cobalt, nickel, iron, vanadium, antimony, and manganese. Suitable organometallic catalysts, exemplified here by tin as the metal, are represented by the formula: $R_nSn[X—R^1—y]_2$, wherein R is a $C_1–C_8$ alkyl or aryl group, $R^1$ is a $C_0–C_{18}$ methylene group optionally substituted or branched with a $C_1–C_4$ alkyl group, Y is hydrogen or a hydroxyl group, preferably hydrogen, X is methylene, an —S—, an —$SR^2COO$—, —SOOC—, an —$O_3S$—, or an —OOC— group wherein $R^2$ is a $C_1–C_4$ alkyl, n is 0 or 2, provided that $R^1$ is $C_0$ only when X is a methylene group.

Specific examples are tin (II) acetate, tin (II) octanoate, tin (II) ethylhexanoate and tin (II) laurate; and dialkyl (1–8C) tin (IV) salts of organic carboxylic acids having 1–32 carbon atoms, preferably 1–20 carbon atoms, e.g., diethyltin diacetate, dibutyltin diacetate, dibutyltin diacetate, dibutyltin dilaurate, dibutyltin maleate, dihexyltin diacetate, and dioctyltin diacetate. Other suitable organotin catalysts are organotin alkoxides and mono or polyalkyl (1–8C) tin (IV) salts of inorganic compounds such as butyltin trichloride, dimethyl- and diethyl- and dibutyl- and dioctyl- and diphenyl-tin oxide, dibutyltin dibutoxide, di(2-ethylhexyl) tin oxide, dibutyltin dichloride, and dioctyltin dioxide. Preferred, however, are tin catalysts with tin-sulfur bonds which are resistant to hydrolysis, such as dialkyl (1–20C) tin dimercaptides, including dimethyl-, dibutyl-, and dioctyl-tin dimercaptides.

More specific examples of surfactants are salts of sulfonic acids, e.g., alkali metal salts or ammonium salts of dodecylbenzene- or dinaphthylmethanedisulfonic acid and ricinoleic acid. Other preferred surfactants include silicone-containing surfactant polymers. The surfactants are usually used in amounts of 0.01 to 5 parts by weight, based on 100 parts by weight of the first-layer resin component. More specific examples of anti-foam agents include siloxane-oxyalkylene copolymers and other organopolysiloxanes, oxyethylated alkyl-phenols, oxyethylated fatty alcohols, paraffin oils, castor oil esters, ricinoleic acid esters, Turkey red oil and groundnut oil. Specific examples of cell regulators include paraffins, fatty alcohols, and dimethylpolysiloxanes.

For the purposes of the subject invention, other fillers include conventional organic and inorganic fillers and reinforcing agents. More specific examples include inorganic fillers, such as silicate minerals, for example, phyllosilicates such as antigorite, serpentine, hornblends, amphiboles, chrysotile, and talc; metal oxides, such as aluminum oxides, titanium oxides and iron oxides; metal salts, such as chalk, barite and inorganic pigments, such as cadmium sulfide, zinc sulfide and glass, inter alia; kaolin (china clay), aluminum silicate and co-precipitates of barium sulfate and aluminum silicate, and natural and synthetic fibrous minerals, such as wollastonite, metal, and glass fibers of various lengths. Examples of suitable organic fillers are carbon black, melamine, colophony, cyclopentadienyl resins, cellulose fibers, polyamide fibers, polyacrylonitrile fibers, polyurethane fibers, and polyester fibers based on aromatic and/or aliphatic dicarboxylic acid esters, and in particular, carbon fibers. The inorganic and organic fillers may be used individually or as mixtures and may be introduced into first-layer resin component or into the first-layer polyisocyanate component in amounts from 0.5 to 40 percent by weight, based on the weight of components (the first-layer resin component and the first-layer polyisocyanate component).

Examples of suitable flame retardants are tricresyl phosphate, tris(2-chloroethyl) phosphate, tris(2-chloropropyl) phosphate, and tris(2,3-dibromopropyl) phosphate. A suitable flame retardant in the first and second-layers of the present invention comprises FYROL® PCF, which is a tris(chloro propyl)phosphate commercially available from Albright & Wilson.

In addition to the above-mentioned halogen-substituted phosphates, it is also possible to use inorganic or organic flame retardants, such as red phosphorus, aluminum oxide hydrate, antimony trioxide, arsenic oxide, ammonium polyphosphate (Exolit®) and calcium sulfate, expandable graphite or cyanuric acid derivatives, e.g., melamine, or mixtures of two or more flame retardants, e.g., ammonium polyphosphates and melamine, and, if desired, corn starch, or ammonium polyphosphate, melamine, and expandable graphite and/or, if desired, aromatic polyesters, in order to flameproof the first-layer.

It is understood in the art that UV performance enhancers, or UV light stabilizers, are sometimes necessary to prevent the breakdown and loss of chemical and physical properties in the composite structure due to UV light. The preferred UV performance enhancers used in the first-layer of the subject invention include Tinuvin 1130 and Tinuvin 292 commercially available from Ciba. Of course, any other UV performance enhancers available from Ciba or other equivalent suppliers include, but are not limited to, Tinuvin 123 and Tinuvin 900.

Further details on the other conventional assistants and additives mentioned above can be obtained from the specialist literature, for example, from the monograph by J. H. Saunders and K. C. Frisch, High Polymers, Volume XVI, Polyurethanes, Parts 1 and 2, Interscience Publishers 1962 and 1964, respectively, or Kunststoff-Handbuch, Polyurethane, Volume VII, Carl-Hanser-Verlag, Munich, Vienna, 1st and 2nd Editions, 1966 and 1983; incorporated herein by reference.

Upon application of the first-layer polyisocyanate component and the first-layer resin component to the mold substrate, the volume ratio of the first-layer polyisocyanate component to the first-layer resin component is from 1:3 to 3:1. More preferably, the volume ratio is 1:1. The thickness of the first-layer in the completed composite structure can vary from 1 to 500 mils. Most preferably, the thickness is from 6 to 36 mils. Furthermore, to balance required physical properties including, but not limited to, rigidity, impact strength, flexural modulus, and heat distortion, the first-layer is designed to have a Shore D hardness of at least 65. Preferably, the Shore D hardness of the first-layer is at least 80, and most preferably ranging from 80 to 90. Upon application, the first-layer has a gel time ranging from 1 to 60 seconds, more preferably from 1 to 10 seconds. A suitable first-layer is Polyeuro A380 Polyurea System from Polycoat Products Corporation, California.

Prior to application to form the first-layer, the mold substrate is tempered to a temperature ranging from 75° F. to 125° F., more preferably from 80° F. to 100° F. Furthermore, it is also preferred to apply a mold-release agent to the mold substrate prior to the step of applying the first-layer polyisocyanate and the first-layer resin components to the mold substrate. As understood by those skilled in the art, the mold-release agent assists in de-molding of the completed composite structure.

The method also includes the step of applying a second-layer polyisocyanate component and a second-layer resin component to form the second-layer which, as described above, is also substantially free of VOCs. The second-layer resin component includes a polyol having a theoretical functionality of at least three. The second-layer of the composite structure is a polyurethane. The second-layer resin component is described in detail below. In the preferred embodiment of the subject invention, the second-layer polyisocyanate component is further defined as polymeric diphenylmethane diisocyanate (PMDI). As with the first-layer polyisocyanate component, the second-layer polyisocyanate component may be a pre-polymer. That is, the second-layer polyisocyanate component may be a PMDI initiated pre-polymer including PMDI in a stoichiometrically excess amount and a polyol resin component. This polyol resin component may be the same as the second-layer resin component.

Other suitable organic polyisocyanates, defined as having 2 or more isocyanate functionalities, include, but are not limited to, conventional aliphatic, cycloaliphatic, araliphatic and aromatic isocyanates other than PMDI. Specific examples include: alkylene diisocyanates with 4 to 12 carbons in the alkylene radical such as 1,12-dodecane diisocyanate, 2-ethyl-1,4-tetramethylene diisocyanate, 2-methyl-1,5-pentamethylene diisocyanate, 1,4-tetramethylene diisocyanate, 1,6-hexamethylene diisocyanate; cycloaliphatic diisocyanates such as 1,3- and 1,4-cyclohexane diisocyanate as well as any mixtures of these isomers, 1-isocyanato-3,3,5-trimethyl-5-isocyanatomethylcyclohexane (isophorone diisocyanate), 2,4- and 2,6-hexahydrotoluene diisocyanate as well as the corresponding isomeric mixtures, 4,4'-2,2'-, and 2,4'-dicyclohexylmethane diisocyanate as well as the corresponding isomeric mixtures and aromatic diisocyanates and polyisocyanates such as 2,4- and 2,6-toluene diisocyanate and the corresponding isomeric mixtures 4,4'-, 2,4'-, and 2,2'-diphenylmethane diisocyanate and the corresponding isomeric mixtures, mixtures of 4,4'-, 2,4'-, and 2,2-diphenylmethane diisocyanates and polyphenylenepolymethylene polyisocyanates (crude MDI), as well as mixtures of crude MDI and toluene diisocyanates. The organic di- and polyisocyanates can be used individually or in the form of mixtures.

Additionally, so-called modified multivalent isocyanates, i.e., products obtained by the partial chemical reaction of organic diisocyanates and/or polyisocyanates may be used. Examples include diisocyanates and/or polyisocyanates containing ester groups, urea groups, biuret groups, allophanate groups, carbodiimide groups, isocyanurate groups, and/or urethane groups. More specific examples include organic, preferably aromatic, polyisocyanates containing urethane groups and having an NCO content of 33.6 to 15 weight percent, preferably 31 to 21 weight percent, based on the total weight, e.g., with low molecular weight diols, triols, dialkylene glycols, trialkylene glycols, or polyoxyalkylene glycols with a molecular weight of up to 6000; modified 4,4'-diphenylmethane diisocyanate or 2,4- and 2,6-toluene diisocyanate, where examples of di- and polyoxyalkylene glycols that may be used individually or as mixtures include diethylene glycol, dipropylene glycol, polyoxyethylene glycol, polyoxypropylene glycol, polyoxyethylene glycol, polyoxypropylene glycol, and polyoxypropylene polyoxyethylene glycols or -triols. Prepolymers containing NCO groups with an NCO content of 29 to 3.5 weight percent, preferably 21 to 14 weight percent, based on the total weight and produced from the polyester polyols and/or preferably polyether polyols described below; 4,4'-diphenylmethane diisocyanate, mixtures of 2,4'- and 4,4'-diphenylmethane diisocyanate, 2,4,- and/or 2,6-toluene diisocyanates or polymeric MDI are also suitable. Furthermore, liquid polyisocyanates containing carbodiimide groups having an NCO content of 33.6 to 15 weight percent, preferably 31 to 21 weight percent, based on the total weight, have also proven suitable, e.g., based on 4,4'- and 2,4'- and/or 2,2'-diphenylmethane diisocyanate and/or 2,4'- and/or 2,6-toluene diisocyanate. The modified polyisocyanates may optionally be mixed together or mixed with unmodified organic polyisocyanates such as 2,4'- and 4,4'-diphenylmethane diisocyanate, polymeric MDI, 2,4'- and/or 2,6-toluene diisocyanate.

The organic isocyanates used in the invention preferably have an average functionality of greater than 2, most preferably 2.5 or more. This provides for a greater crosslinking density which improves the overall dimensional stability of the composite structure.

To produce the second-layer of the subject invention, the second-layer polyisocyanate component and the isocyanate reactive compounds, i.e., the second-layer resin component, are reacted in such amounts that the isocyanate index, defined as the number of equivalents of NCO groups divided by the total number of isocyanate reactive hydrogen atom equivalents multiplied by 100, ranges from about 80 to less than about 150, preferably from about 90 to 110. If the second-layer contains, at least in part, bonded isocyanurate groups, an isocyanate index of 150 to 6000, preferably from 200 to 800, is preferred.

The second-layer resin component of the second-layer includes at least one polyol having a theoretical functionality of at least three. By theoretical functionality, it is meant that the functionality expected is based upon the functionality of the initiator molecule, rather than the actual functionality of the at least one polyol after manufacture. The at least one polyol may be either a polyether polyol or a polyester polyol. The at least one polyol is present in the second-layer resin component in an amount from 20 to 60, more preferably from 30 to 50, parts by weight based on 100 parts by weight of the second-layer resin component. The at least one polyol includes an initiator compound having at least three functional groups. As is known in the art, suitable initiators for polyols primarily include low molecular weight di- and polyfunctional alcohols or polyamines. As such, the initiator compound of the subject invention is preferably selected from the group consisting of glycerin, methyl glucoside, pentaerythritol, sorbitol, sucrose, toluenediamine, ethylenediamine, and mixtures thereof. Of course, other suitable initiator compounds for the at least one polyol include, but are not limited to, trimethylolpropane, propylene glycol, dipropylene glycol, and 2,2-bis(4-hydroxyphenyl)-propane, and mixtures thereof.

Preferably, the second-layer resin component includes a plurality of polyols. In this preferred embodiment, the plurality is present in an amount from 20 to 60, more preferably from 30 to 50, parts by weight based on 100 parts by weight of the second-layer resin component. The plurality of polyols includes, at least, a first polyether polyol which will be described in detail immediately below. However, it is to be understood that, in addition to the first polyether polyol, the plurality of polyols may also include polyester polyols. The first polyether polyol is present in the second-layer resin component in an amount from 10 to 30 parts by weight based on 100 parts by weight of the second-layer resin component. The first polyether polyol has a hydroxyl number of 200 meq polyol/g KOH or more and a viscosity of 5,000 centipoise or less at 25° C. More preferably, the hydroxyl number of the first polyether polyol is from 225 to 295 meq polyol/g KOH, and the viscosity is from 2000 to 3200 centipoise at 25° C. Further, the average molecular weight of the sucrose-glycerin co-initiated polyether polyol is from 500 to 5,000.

Suitable polyols for the second-layer resin component include, but are not limited to, all phthalic anhydride-initiated polyester polyols, aromatic amine-initiated polyols, aliphatic amine-initiated polyols, polyoxyalkylene polyether polyols, polythioether polyols, polyester amides and polyacetals containing hydroxyl groups, aliphatic polycarbonates containing hydroxyl groups, amine terminated polyoxyalkylene polyethers, polyester polyols, other polyoxyalkylene polyether polyols, and graft dispersion polyols, and mixtures thereof.

Included among the polyoxyalkylene polyether polyols are polyoxyethylene polyols, polyoxypropylene polyols, polyoxybutylene polyols, polytetramethylene polyols, and block copolymers, for example combinations of polyoxypropylene and polyoxyethylene poly-1,2-oxybutylene and polyoxyethylene polyols, poly-1,4-tetramethylene and polyoxyethylene polyols, and copolymer polyols prepared from blends or sequential addition of two or more alkylene oxides. The polyoxyalkylene polyether polyols may be prepared by any known process such as, for example, the process disclosed by Wurtz in 1859 and *Encyclopedia of Chemical Technology*, Vol. 7, pp. 257–262, published by Interscience Publishers, Inc. (1951) or in U.S. Pat. No. 1,922,459, the disclosures of which are incorporated herein by reference. The alkylene oxides may be added to the initiator compound, individually, sequentially one after the other in blocks, or in mixture to form a heteric polyether. The polyoxyalkylene polyether polyols may have either primary or secondary hydroxyl groups.

The polyoxyalkylene polyether polyols may be aromatic amine-initiated or aliphatic amine-initiated polyoxyalkylene polyether polyols. It is preferred that at least one of the amine-initiated polyols is polyether polyol terminated with a secondary hydroxyl group through addition of, for example, propylene oxide as the terminal block. It is preferred that the amine-initiated polyols contain 50 weight percent or more, and up to 100 weight percent, of secondary hydroxyl group forming alkylene oxides, such as polyoxypropylene groups, based on the weight of all oxyalkylene groups. This amount can be achieved by adding 50 weight percent or more of the secondary hydroxyl group forming alkylene oxides to the initiator molecule in the course of manufacturing the polyol.

As discussed above suitable initiator compounds for the polyol include primary or secondary amines. These would include, for the aromatic amine-initiated polyether polyol, the aromatic amines such as aniline, N-alkylphenylenediamines, 2,4'-, 2,2'-, and 4,4'-methylenedianiline, 2,6- or 2,4-toluenediamine, vicinal toluenediamines, o-chloroaniline, p-aminoaniline, 1,5-diaminonaphthalene, methylene dianiline, the various condensation products of aniline and formaldehyde, and the isomeric diaminotoluenes, with preference given to vicinal toluene diamines.

For the aliphatic amine-initiated polyol, any aliphatic amine, whether branched or unbranched, substituted or unsubstituted, saturated or unsaturated, may be used. These would include, as examples, mono-, di-, and trialkanolamines, such as monoethanolamine, methylamine, triisopropanolamine; and polyamines such as ethylene diamine, propylene diamine, diethylenetriamine; or 1,3-diaminopropane, 1,3-diaminobutane, and 1,4-diaminobutane. Preferable aliphatic amines include any of the diamines and triamines, most preferably, the diamines.

The polyoxyalkylene polyether polyols may generally be prepared by polymerizing alkylene oxides with polyhydric amines. Any suitable alkylene oxide may be used such as ethylene oxide, propylene oxide, butylene oxide, amylene oxide, and mixtures of these oxides. The polyoxyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide.

The preferred polyols for the plurality are initiated with polyhydroxyl compounds having at least 4 sites reactive with alkylene oxides, and further may be oxyalkylated solely with propylene oxide.

Also suitable are polymer modified polyols, in particular, the so-called graft polyols. Graft polyols are well known to the art and are prepared by the in situ polymerization of one or more vinyl monomers, preferably acrylonitrile and styrene, in the presence of a polyether polyol, particularly polyols containing a minor amount of natural or induced unsaturation. Methods of preparing such graft polyols may be found in columns 1–5 and in the Examples of U.S. Pat. No. 3,652,639; in columns 1–6 and in the Examples of U.S. Pat. No. 3,823,201; in columns 2–8 and in the Examples of U.S. Pat. No. 4,690,956: and in U.S. Pat. No. 4,524,157; all of which patents are herein incorporated by reference.

Non-graft polymer modified polyols are also suitable, for example, as those prepared by the reaction of a polyisocyanate with an alkanolamine in the presence of a polyether polyol as taught by U.S. Pat. Nos. 4,293,470; 4,296,213; and 4,374,209; dispersions of polyisocyanurates containing pendant urea groups as taught by U.S. Pat. No. 4,386,167; and polyisocyanurate dispersions also containing biuret linkages as taught by U.S. Pat. No. 4,359,541. Other polymer modified polyols may be prepared by the in situ size reduction of polymers until the particle size is less than 20 mm, preferably less than 10 mm.

Other than the at least one polyol, which has already been specifically described above, the other polyols in the second-layer resin component, as for example those listed above, preferably have an average hydroxyl number of 200 or more meq polyol/g KOH. The optimum nominal functionality of aromatic polyester polyols is 2 or more, with average hydroxyl numbers of 350 or more. Likewise, the optimum nominal functionality of each amine-initiated polyol is 4 or more, with average hydroxyl numbers of 400 or more. Individual polyols within the plurality may be used which fall below the above average hydroxyl numbers, but the average should be within this range.

The initiator compound in the most preferred embodiment for the first polyether polyol is made from an initiator mixture of sucrose and glycerin. In this embodiment, there is a high amount of sucrose and a minimal amount of glycerin such that the sucrose/glycerin mixture has an average functionality of 7. The sucrose/glycerin mixture of the initiator compound is reacted to from a sucrose-glycerin co-initiated polyether polyol. A suitable sucrose-glycerin co-initiated polyether polyol is commercially available as Tri-iso Polyol G-26 from Tri-iso, Inc., California.

In addition to the at least one polyol, the second-layer resin component may further include a cross-linking agent, i.e., a chain extending agent, selected from the group consisting of diols, and mixtures thereof. More specifically, the diols include any aliphatic, cycloaliphatic and/or araliphatic diol having from 2 to 14 carbon atoms, preferably from 4 to 10 carbon atoms. The cross-linking agent helps achieve the desired mechanical hardness and dimensional stability in the second-layer and therefore in the overall composite structure. In addition to diols, the cross-linking agent can also include dialkylene glycols. Preferably, the diol selected is diethylene glycol (DEG). Alternative cross-linking agents include, but are not limited to, ethylene glycol, propylene glycol, 1,4-butanediol, 1,6-hexanediol, 1,3-propanediol, 1,10-decanediol, o-, m-, and p-dihydroxycyclohexane, diethylene glycol, dipropylene glycol, bis(2-hydroxyethyl) hydroquinone, and even triols such as 1,2,4- and 1,3,5-trihydroxycyclohexane, glycerol, and trimethylolpropane, and mixtures thereof. The cross-linking agent typically has a number average molecular weight of less than 400, preferably from 60 to 300 and is present in the second-layer resin component in an amount from 10 to 30 parts by weight based on 100 parts by weight of the second-layer resin component. The polyurethane second-layer can also be prepared by using secondary aromatic diamines, primary aromatic diamines, 3,3'-di- and/or 3,3'-, 5,5'-tetraalkyl-substituted diaminodiphenyl-methanes as the cross-linking agent instead of or mixed with the above-mentioned diols and/or triols.

The second-layer resin component also optionally includes propylene carbonate. If utilized in the subject invention, the propylene carbonate functions as a reactive diluent to broaden the 'workability' window of the subject invention by minimizing the viscosity of the second-layer resin component, and ultimately of the second-layer, and also by enabling the composite structure to cure, i.e., react, on the mold substrate at lower temperatures without the need for supplemental heat and/or supplemental catalyst. The propylene carbonate, if utilized, is present in the second-layer resin component in an amount from 1 to 15 parts by weight based on 100 parts by weight of the second-layer resin component.

As with the first-layer resin component, the second-layer resin component may also include one or more additives directed at enhancing the performance of one or more physical properties of the first-layer. For instance, the additive or additives may be selected from the group consisting of surfactants, flame retardants, fillers, dyes, water scavengers, anti-foam agents, catalysts, UV performance enhancers, pigments, hindered amine light stabilizers, and mixtures thereof. The additives available for use in the second-layer are the same as those additives described above in terms of the first-layer. Additionally, the second-layer resin component can include a dye, that, along with the second-layer resin component, mixes with the second-layer polyisocyanate component to indicate thorough mixing between the second-layer polyisocyanate component and the second-layer resin component. In the preferred embodiment, this dye is a blue dye that mixes with the second-layer polyisocyanate component, which is partially yellow, to form a second-layer that, if green, indicates thorough mixing between the second-layer polyisocyanate component and the second-layer resin component. Of course, other suitable colors can be selected for this dye.

As for catalysis of the reaction between the second-layer polyisocyanate component and the second-layer resin component, in addition to the catalysts already identified above, tertiary amines also promote urethane linkage formation. These amines include triethylamine, 3-methoxypropyldimethylamine, triethylenediamine, tributylamine, dimethylbenzylamine, N-methyl-, N-ethyl- and N-cyclohexylmorpholine, N,N,N',N'-tetramethylethylenediamine, N,N,N',N'-tetramethylbutanediamine or -hexanediamine, N,N,N'-trimethyl isopropyl propylenediamine, pentamethyldiethylenetriamine, tetramethyldiaminoethyl ether, bis(dimethylaminopropyl)urea, dimethylpiperazine, 1-methyl4-dimethylaminoethyl-piperazine, 1,2-dimethylimidazole, 1-azabicylo[3.3.0]octane and preferably 1,4-diazabicylol[2.2.2]octane, and alkanolamine compounds, such as triethanolamine, triisopropanolamine, N-methyl- and N-ethyldiethanolamine and dimethylethanolamine.

Furthermore, to balance required physical properties including, but not limited to, rigidity, impact strength, flexural modulus, and overall durability and support of the first-layer, the second-layer is designed to further include chopped fibers as is known in the art to enhance structural integrity. These chopped fibers include, but are not limited to, chopped fiberglass, chopped carbon fibers, chopped wood fibers, chopped aramid fibers including all aromatic polyamide materials, chopped polymer fibers such as nylon, and mixtures thereof. Preferably, the chopped fiber is chopped fiberglass that is present in the second-layer in an amount from 1 to 50, more preferably from 15 to 35, parts by weight based on 100 parts by weight of the second-layer. It is also preferred that the chopped fibers, e.g. the chopped fiberglass, are incorporated into the second-layer as the second-layer components are being applied to the mold substrate.

In the preferred embodiment of the subject invention, application of the second-layer polyisocyanate and of the second-layer resin component is repeated such that the completed composite structure includes a plurality of second-layers. Structural reinforcement elements may be incorporated between each of the second-layers to provide additional support to the composite structure, whatever the shape. These structural reinforcement elements include, but are not limited to, wood, cardboard, foam, and combinations thereof.

The second-layer polyisocyanate component and the second-layer resin component are applied to the mold substrate after the first-layer is applied. As with the first-layer, it is preferred that the second-layer be applies as the mold substrate is tempered to a temperature ranging from 75° F. to 125° F., more preferably from 80° F. to 100° F. During application of the second-layer, the volume ratio of the second-layer polyisocyanate component to the second-layer resin component is from 1:3 to 3:1. More preferably, the volume ratio is 1:1.

The thickness of the second-layer in the completed composite structure can vary from 1 to 2000 mils. Most preferably, the thickness is from 100 to 400 mils. Upon application, the second-layer has a gel time ranging from 1 to 15 minutes, more preferably from 5 to 10 minutes. The preferred 5 to 10 minute gel time of the second-layer then permits an operator to flatten the chopped fibers between applications of the second-layer components. As such, the chopped fibers, whatever they are, are flattened in each of the second-layers of the composite structure to ensure maximum enhancement of the structural integrity of the composite structure. This flattening step is performed by taking a roller-type device, such as a conventional paint roller, and rolling each of the second-layers between application of the second-layers.

The composite structure of the preferred embodiment also includes a barrier-layer, or barrier coat, in addition to the first and second-layers. More specifically, the barrier layer is disposed between the first and second-layers. In the completed composite structure, the barrier layer is applied to a thickness varying from 1 to 1000 mils.

Between the first and second-layers, the barrier layer optimizes gel times as well as the cross-linking rates between the first and second-layers. As such, the barrier layer minimizes any 'peel' realized in the first-layer which, as described above, is the show surface of the composite structure. Specifically, the barrier layer has a gel time ranging from 1 second to 2 minutes, more preferably from 1 to 20 seconds. As such, the barrier layer bridges the gap that exists between the respective gel times of the first and second-layers thereby minimizing peel in the show surface.

The barrier layer used in the method of the subject invention is the reaction product of a barrier layer polyisocyanate component, and a barrier-layer resin component. Most preferably, the barrier layer resin component is a blend of at least a trimethylol propane-initiated polyether polyol having a hydroxyl number of 30 meq polyol/g KOH or more and an average functionality of from 2 to 3, and a vicinal toluenediamine-initiated polyether polyol having a hydroxyl number of 300 meq polyol/g KOH or more and an average functionality of from 3.5 to 4.5.

After application of the components for the first, barrier, and second layers, the completed composite structure is de-molded from the mold substrate by any suitable de-molding step. A suitable de-molding step to remove the composite structure from the mold substrate involves the injection of air through an access port. The access port enables the air to reach an interior space between the composite structure and the mold substrate such that displacement of the composite structure from the mold substrate can take place when air is introduced. In all instances of application of the respective components for the first, the barrier, and the second layers, the components were spray applied. More specifically, a 2-component proportioning unit, preferably a Gusmer unit, was utilized with any suitable air-atomizing gun. Mixture of the components occurred at the gun head upon application to the mold substrate. In the event one of the layers was supplemented with the chopped fibers, a fiber chopper, preferably having a blade wheel, was utilized to introduce the chopped fibers into the spray pattern.

The completed composite structure prepared by the method of the subject invention exhibits a flexural modulus of at least 200,000 lb/in$^2$. More preferably, the flexural modulus is at least 250,000 lb/in$^2$. It is known in the art that flexural modulus is a mechanical method for defining the stiffness of a composite structure under flexing. In the subject invention, the preferred method for determining the flexural modulus of the composite structure is ASTM Test Method D 790 which is a three-point bend test that applies a load to a specimen, such as a ⅛ by ½ by 4 inch specimen, of the composite structure as the composite structure is supported at each end. The completed composite structure of the subject invention is also designed to achieve an impact resistance of from 0.5 to 6 ft-lb/in, preferably from 1.0 to 3.0 ft-lb/in, notched izod as measured according to ASTM Test Method D 256.

The following examples, illustrating the formation of the first-layer, the second-layer, the barrier-layer, and the complete composite structure, as presented herein, are intended to illustrate and not limit the invention.

EXAMPLES

The first-layer composition of the composite structure is prepared by adding and reacting the following parts, by weight, unless otherwise indicated.

| First-layer Reactant | Amount (parts by weight) |
|---|---|
| First-layer Resin Component | |
| POLYAMINE A | 40.3 |
| Polyaspartic Ester | |
| (Desmophen NH 1220) | |
| ISOPHORNE DIAMINE | 2.0 |
| DISPERPLAST 1142 | 0.4 |
| CLEARLINK 1000 | 20.0 |
| FILLER A | 18.0 |
| [Talc] MP-1250 | |
| FILLER B | 0.5 |
| [Aerosil 972] | |
| UV ABSORBER | 0.3 |
| [Tinuvin 1130] | |
| UV PERFORMANCE ENHANCER | 0.6 |
| (hindered amine light stabilizer) | |
| [Tinuvin 292] | |
| CATALYST A | 0.06 |
| [Catalyst 315] | |
| CATALYST B | 0.06 |
| [Dabco 33 LV] | |
| CATALYST C | 0.03 |
| [Formez SUL-4] | |
| PIGMENT A | 15.0 |
| [DuPont R-960 TiO$_2$ Pigment] | |
| Moisture Scavenger | 2.0 |
| [Unisiv 3A powder] | |
| Defoamer | 0.02 |
| [Sag 47] | |
| Deareator | 0.4 |
| [Byk 361] | |
| Adhesion Promoter | 0.4 |
| [Silaquest A-187] | |
| First-layer Polyisocyanate Component | |
| ISOCYANATE A | 13 |
| [IPDI] | |
| Polyol | 19.5 |
| [1000 MW propylene polyether polyol] | |

-continued

| First-layer Reactant | Amount (parts by weight) |
|---|---|
| DINP | 5.4 |
| CATALYST [Formez SUL-4] | 0.05 |
| N-3300 | 62.0 |

The second-layer composition of the composite structure is prepared by adding and reacting the following parts, by weight, unless otherwise indicated.

| Second-layer Reactant | Amount (parts by weight) |
|---|---|
| Second-layer Resin Component | |
| POLYOL A [a trimethylolpropane initiated polyether polyol having a hydroxyl number of about 35, and an average functionality of about 2.5] | 22.50 |
| POLYOL B [a sucrose - glycerin co-initiated polyether polyol having a hydroxyl number of about 260, and an average functionality of about 7.0] | 17.00 |
| CROSS-LINKING AGENT A [diethylene glycol] | 23.00 |
| REACTIVE DILUENT A [propylene carbonate] | 9.98 |
| FILLER C [aluminum tri-hydrate] | 24.00 |
| OTHER ADDITIVES | 3.50 |
| Second-layer Polyisocyanate Component | |
| ISOCYANATE B [a polymeric diphenylmethane diisocyanate (PMDI)] | 94.50 |

The barrier-layer composition of the composite structure is prepared by adding and reacting the following parts, by weight, unless otherwise indicated.

| Barrier-layer Reactant | Amount (parts by weight) |
|---|---|
| Barrier-layer Resin Component | |
| POLYOL A [a trimethylolpropane initiated polyether polyol having a hydroxyl number of about 35, and an average functionality of about 2.5] | 18.00 |
| POLYOL C [a vicinal toluenediamine-initiated polyether polyol having a hydroxyl number of about 390, and an average functionality of about 4.0] | 27.43 |
| CROSS-LINKING AGENT A [diethylene glycol] | 18.00 |
| REACTIVE DILUENT A [propylene carbonate] | 7.00 |
| FILLER C [aluminum tri-hydrate] | 23.00 |
| CATALYST C [Formez ul-28] | 0.05 |
| CROSS-LINKING AGENT B [diethyltoluenediamine] | 3.00 |
| OTHER ADDITIVES | 3.52 |
| Barrier-layer Polyisocyanate Component | |
| ISOCYANATE B [a polymeric diphenylmethane diisocyanate (PMDI)] | 94.50 |

To make the composite structure, the first layer is first applied to a mold substrate. Prior to application of the first layer it is preferred that a mold-release agent is applied to the mold substrate, and it is also preferred that the mold substrate is tempered to a temperature ranging from 75° F. to 125° F. The first layer is spray applied to the mold substrate to a thickness from 1 to 500 mils. Furthermore, the first layer has a gel time ranging from 1 to 60 seconds and exhibits a Shore D hardness of at least 65.

Next, the barrier-layer is applied to the first layer. More specifically, the barrier layer is spray applied to a thickness of from 1 to 1000 mils. The barrier layer has a gel time ranging from 1 second to 2 minutes. Next, the second layer is applied to the barrier-layer to establish the complete composite structure. The second layer is sprayed to a thickness from 1 to 2000 mils and has a gel time ranging from 1 to 15 minutes. The completed composite structure is de-molded from the mold substrate by any suitable method after a predetermined set time.

The complete composite structure exhibited good physical properties, including a flexural modulus of at least 200,000 lb/in$^2$.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

We claim:

1. A method for making a composite structure having a flexural modulus of at least 200,000 lb/in$_2$ wherein the composite structure includes at least one first-layer and at least one second-layer, said method comprising the steps of:
   (a) providing a mold substrate;
   (b) applying a first-layer of the composite structure to the mold substrate, said first-layer comprising the reaction product of a first-layer polyisocyanate component including an aliphatic polyisocyanate and a first-layer resin component including a polyamine and being substantially free of volatile organic compounds, wherein said first-layer is a show surface of the composite structure and has a Shore D hardness of at least 65; and
   (c) applying a second-layer of the composite structure to said first-layer, said second-layer comprising the reaction product of a second-layer polyisocyanate component and a second-layer resin component including a polyol having a theoretical functionality of at least three and being substantially free of volatile organic compounds
   (d) demolding the composite structure from the mold substrate.

2. A method as set forth in claim 1 wherein the step (b) of applying the first-layer is further defined as applying the first-layer to a thickness of from 1 to 500 mils.

3. A method as set forth in claim 1 wherein the step (c) of applying the second-layer is further defined as applying the second-layer to a thickness of from 1 to 2000 mils.

4. A method as set forth in claim 1 wherein the step (b) of applying the first-layer is further defined as applying the first-layer such that the first-layer has a gel time ranging from 1 to 60 seconds.

5. A method as set forth in claim 1 wherein the step (c) of applying the second-layer is further defined as applying the second-layer such that the second-layer has a gel time ranging from 1 to 15 minutes.

6. A method as set forth in claim 1 wherein the step (b) of applying the first-layer is further defined as applying the first-layer in a volume ratio from 1:3 to 3:1.

7. A method as set forth in claim 1 wherein the step (c) of applying the second-layer is further defined as applying the second-layer in a volume ratio from 1:3 to 3:1.

8. A method as set forth in claim 1 further comprising the step of applying a mold-release agent to the mold substrate prior to the step (b) of applying the first-layer.

9. A method as set forth in claim 1 further comprising the step of tempering the mold substrate to a temperature ranging from 75° F. to 125° F.

10. A method as set forth in claim 1 further comprising the step of incorporating propylene carbonate into the second-layer resin component.

11. A method as set forth in claim 10 wherein the step of incorporating propylene carbonate into the second-layer resin component is further defined as incorporating the propylene carbonate into the second-layer resin component in an amount from 1 to 15 parts by weight based on 100 parts by weight of the second-layer resin component.

12. A method as set forth in claim 1 further comprising the step of incorporating a cross-linking agent into the second-layer resin component.

13. A method as set forth in claim 12 wherein the step of incorporating the cross-linking agent into the second-layer resin component is further defined as incorporating the cross-linking agent into the second-layer resin component in an amount from 10 to 30 parts by weight based on 100 parts by weight of the second-layer resin component wherein the cross-linking agent comprises a diol.

14. A method as set forth in claim 1 further comprising the step of incorporating at least one additive into the second-layer resin component wherein the additive is selected from the group consisting of surfactants, flame retardants, fillers, dyes, water scavengers, anti-foam agents, catalysts, UV performance enhancers, pigments, hindered amine light stabilizers, and mixtures thereof.

15. A method as set forth in claim 1 wherein the step (c) of applying the second-layer is further defined as repeating the application of the reaction product of the second-layer polyisocyanate component and the second-layer resin component such that the composite structure includes a plurality of second-layers.

16. A method as set forth in claim 15 further comprising the step of incorporating at least one structural reinforcement element between each of the second-layers.

17. A method as set forth in claim 16 wherein the step of incorporating at least one structural reinforcement element is further defined as incorporating at least one structural reinforcement element selected from the group consisting of wood, cardboard, foam, and combinations thereof.

18. A method as set forth in claim 1 wherein the step (c) of applying the second-layer is further defined as incorporating chopped fibers into the second-layer reaction mixture to form the second-layer.

19. A method as set forth in claim 18 wherein the step of incorporating chopped fibers to form the second-layer is further defined as incorporating chopped fibers selected from the group consisting of chopped fiberglass, chopped carbon fibers, chopped wood fibers, chopped aramid fibers, chopped polymer fibers, and mixtures thereof.

20. A method as set forth in claim 18 wherein the step (c) of applying the second-layer is further defined as repeating the application of the reaction product of the second-layer polyisocyanate component and the second-layer resin component such that the composite structure includes a plurality of second-layers.

21. A method as set forth in claim 20 further comprising the step of flattening the chopped fibers between application of the second-layers such that the chopped fibers are flattened between each of the second-layers of the composite structure.

22. A method as set forth in claim 21 wherein the step of flattening the chopped fibers between application of the second-layers is further defined as rolling the second-layers between application of each of the second-layers.

23. A method as set forth in claim 1 further comprising the step of applying a barrier layer comprising the reaction product of a barrier layer polyisocyanate component and a barrier layer resin component to the first-layer to form a barrier layer of the composite structure disposed between the first and second-layers.

24. A method as set forth in claim 23 wherein the step of applying the barrier layer is further defined as applying the barrier layer to a thickness of from 1 to 1000 mils.

25. A method as set forth in claim 23 wherein the step of applying the barrier layer is further defined as applying the barrier layer such that the barrier layer has a gel time ranging from 1 second to 2 minutes.

26. A method as set forth in claim 23 wherein the barrier-layer resin component includes a blend of a trimethylol propane—initiated polyether polyol having a hydroxyl number of 30 meq polyol/g KOH or more and an average functionality of from 2 to 3, and a vicinal toluenediamine—initiated polyether polyol having a hydroxyl number of 300 meq polyol/g KOH or more and an average functionality of from 3.5 to 4.5.

27. A method as set forth in claim 1 wherein the aliphatic polyisocyanate of the first-layer polyisocyanate component is selected from the group consisting of hexamethylene diisocyanate, isophorone diisocyanate, hexamethylene diisocyanate initiated pre-polymer, and isophorone diisocyanate initiated pre-polymer, and mixtures thereof.

28. A method as set forth in claim 1 wherein the polyamine of the first-layer resin component is an aliphalic polyamine selected from the group consisting of polyoxyalkylene amines, polyoxyalkylene diamines, polyoxyalkylene triamines, and mixtures thereof.

29. A method as set forth in claim 1 wherein the second-layer polyisocyanate component comprises polymeric diphenylmethane diisocyanate.

30. A method as set forth in claim 1 wherein the polyol of the second-layer resin component is made from an initiator compound selected from the group consisting of glycerin, methyl glucoside, pentaerythritol, sorbitol, sucrose, toluenediamine, ethylenediamine, and mixtures thereof.

31. A method as set forth in claim 1 wherein the polyol of the second-layer resin component is made from an initiator compound comprising a mixture of sucrose and glycerin and having an average theoretical functionality of 7.

32. A method as set forth in claim 1 wherein the step (b) of applying the first-layer is further defined as spraying the first-layer.

33. A method as set forth in claim 1 wherein the step (c) of applying the second-layer is further defined as spraying the second-layer.

34. A method as set forth in claim 23 wherein the step of applying the barrier layer is further defined as spraying the barrier layer.

35. A method as set forth in claim 23 wherein said barrier layer is substantially free of volatile organic compounds.

36. A method for making a composite structure having a flexural modulus of at least 200,000 $lb/in^2$ wherein the composite structure includes at least one first-layer and at least one second-layer, said method comprising the steps of:

(a) providing a mold substrate;

(b) applying a first-layer of the composite structure to the mold substrate, said first-layer comprising the reaction product of a first-layer polyisocyanate component including an aliphatic polyisocyanate and a first-layer resin component including a polyamine and being substantially free of volatile organic compounds, wherein said first-layer is a show surface of the composite structure and has a Shore D hardness of at least 65; and (c) applying a barrier layer to the first-layer to form a barrier layer of the composite structure disposed between the first and second-layers, said barrier layer comprising the reaction product of a barrier layer polyisocyanate component and a barrier layer resin component; and (d) applying a second-layer of the composite structure to said barrier layer, said second-layer comprising the reaction product of a second-layer polyisocyanate component and a second-layer resin component including a polyol having a theoretical functionality of at least three and being substantially free of volatile organic compounds; and (e) demolding the composite structure from the mold substrate.

37. A method for making a composite structure having a flexural modulus of at least 200,000 $lb/in^2$ wherein the composite structure includes at least one first-layer and at least one second-layer, said method comprising the steps of:

(a) providing a mold substrate;

(b) applying a polyurea component containing at least one UV performance enhancing additive to the mold substrate to form the first-layer of the composite structure that is substantially free of volatile organic compounds, wherein the first-layer is a show surface of the composite structure and has a Shore D hardness of at least 65; and (c) applying a second-layer comprising the reaction product of a polyisocyanate component and a resin component including at least one polyol having a theoretical functionality of at least three to the first-layer to form the second-layer of the composite structure that is substantially free of volatile organic compounds; and (d) demolding the composite structure from the mold substrate.

* * * * *